Dec. 25, 1962 J. L. OWNER ET AL 3,070,668

HAND RECORDING APPARATUS

Filed Nov. 20, 1957 2 Sheets-Sheet 1

INVENTORS
JOHN LECHMERE OWNER
JOHN ARCHER
BY
Frank R. Trifari
AGENT

HAND RECORDING APPARATUS

Filed Nov. 20, 1957 2 Sheets-Sheet 2

INVENTORS
JOHN LECHMERE OWNER
JOHN ARCHER
BY
Frank R. Trifari
AGENT 3,070,668

HAND RECORDING APPARATUS

John Lechmere Owner, Dulwich, and John Archer, London, England, assignors to North American Philips Company, Inc., New York, N.Y.

Filed Nov. 20, 1957, Ser. No. 697,712
Claims priority, application Great Britain Nov. 22, 1956
3 Claims. (Cl. 179—100.2)

Figure 1:
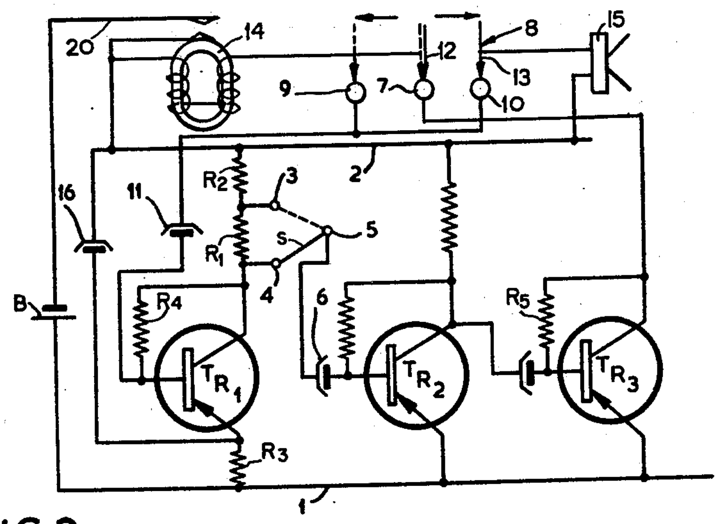

The invention relates to the magnetic recording and reproduction of electrical signals.

Apparatus of this character as hitherto constructed has comprised motor driven mechanical means for traversing a magnetic record medium, for example a tape or wire, past a magnetic record/reproduce head connected to an amplifier.

We have discovered that it is possible to record electrical signals corresponding to speech by moving a magnetic record head by hand over a stationary record medium and to reproduce such speech in an intelligible form by similar movement by hand of a reproduce head over such record medium.

Accordingly the object of the invention is to provide miniature magnetic recording and reproducing apparatus which can be used in this way.

The invention accordingly consists in magnetic recording and reproducing apparatus so constructed as to be capable of being held in the hand of the user for movement by the hand over a magnetic record medium for both recording and reproducing electrical signals. Such electrical signals may be derived from a microphone when energized by speech during recording and supplied to a telephone during reproduction, and if required said microphone and telephone may consist of one electro-acoustic transducer. This transducer may or may not be carried in the hand-held apparatus.

The invention also consists in magnetic recording and reproducing apparatus comprising a magnetic recording and reproducing head, an electro-acoustic transducer, an amplifier, a power source, for example, a battery, switching means for changing over from recording to reproducing and vice versa characterized in that a single housing contains the change-over switch, the magnetic head, and the amplifier, which is preferably a transistor amplifier and, if desired the power supply source; the housing is so constructed as to be capable of being held in the hand of the user for movement of the operative portion of the head by the hand over a magnetic record medium.

The invention still further consists in apparatus for the magnetic recording and reproducing of signals, for example, speech as set forth in the preceding paragraph comprising a single record/reproduce head, an electro-acoustic transducer, an amplifier, means for supplying pre-magnetization while recording, and switching means for changing over the connection of the head and the transducer to the input and the output circuit of the amplifier or vice versa characterized in that the amplifier is a transistor amplifier and said premagnetization is provided by a D.C. current, the substantially correct value of which is produced when the head is connected in the output circuit of the output transistor.

The invention also consists in the further features hereinafter described and claimed.

It will be understood that during the reading process when the head is connected to the input of the amplifier it is necessary for good frequency response that the impedance of the head relative to the input impedance of the amplifier should be suitably chosen and this is one of the parameters affecting the electrical "size" of the winding.

Further, during the recording process when the head is connected in the output circuit of the amplifier, similar considerations relating to efficient energy transfer apply but with the added requirement that the ampere turns of the head winding taken in conjunction with a standing current (for example, the collector current of the output transistor) flowing in the winding, will produce the required D.-C. bias for the particular recording medium chosen, for example, magnetically coated tape or sheet.

It will also be understood that the electro-acoustic transducer may be used both as a telephone and as a microphone and for this purpose may be of the electro-magnetic type. We have found that the normal miniature earpiece telephone used with transistor hearing aids makes a satisfactory microphone for speech.

Figure 2:
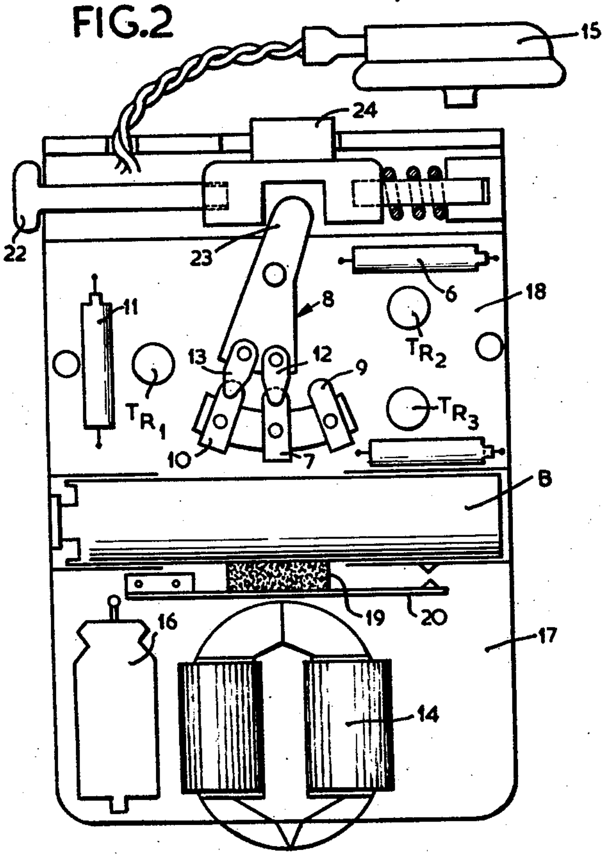
Figure 3:
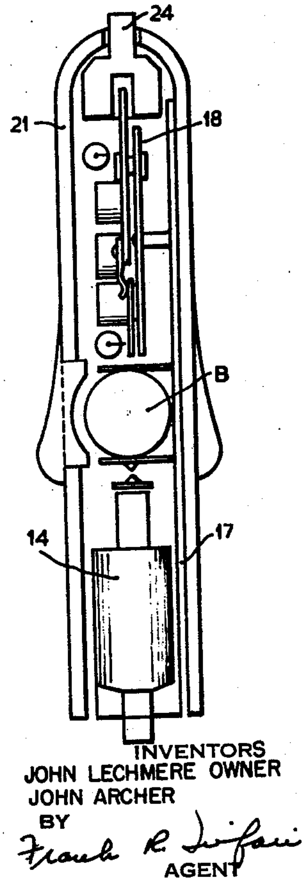
Figures 4, 5, 6:
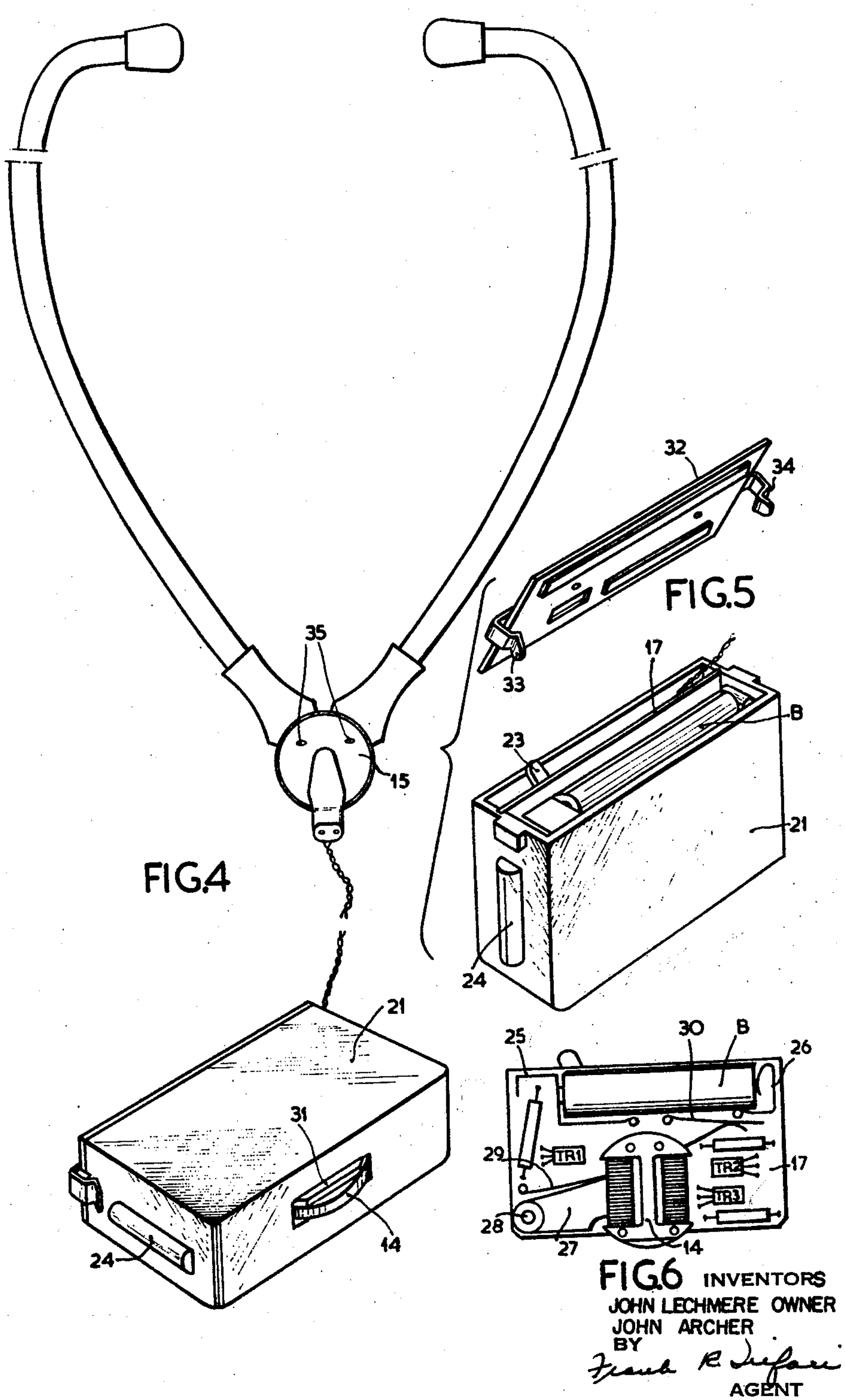

In order that the invention may be more clearly understood it will now be described with reference to the drawings accompanying the specification in which:

FIGURE 1 is a circuit diagram of one convenient form of transistor record/reproduce amplifier, FIGURE 2 is a front elevation of one constructional form of apparatus, FIGURE 3 is a side elevation of FIGURE 2, FIGURE 4 shows an alternative constructional form of apparatus, FIGURE 5 shows the magnetic recording and reproducing apparatus on its housing with the cover removed, and FIGURE 6 shows a front elevation of the amplifier panel.

Referring now to FIGURES 1, 2 and 3, $TR_1$ represents a p-n-p transistor having its emitter coupled to the common positive line 1, from battery B through resistor $R_3$. The emitter circuit is decoupled by capacitor 16. The collector is fed from common negative line 2 through resistors $R_1$, $R_2$ and the necessary base bias is provided by resistor $R_4$ connected between the collector and the base. The junction of $R_1$, $R_2$ is connected to a switch contact 3 and the collector of $TR_1$ to a further contact 4, the switch arm S being connected through capacitor 6 to the base of a second transistor $TR_2$. The resistance values of $R_1$ and $R_2$ are suitably chosen to give alternative (soft and loud) volume levels.

Transistor $TR_2$ is similarly RC coupled to the output transistor $TR_3$, the collector of which is connected to fixed contact 7 of changeover (read-write) switch 8 which is shown in the writing position. Fixed contacts 9 and 10 of the switch 8 are coupled together and through capacitor 11 to the base of the transistor $TR_1$.

The moving contact 12 of the pair 12, 13 is connected to one end of the winding on the magnetic head 14, the other end of the winding being coupled to the negative line 2. Contact 13 is connected to one pole of the magnetic earpiece 15, the other pole of which is similarly connected to the negative line 2.

In the position shown in the drawing in full lines of the switch 8, the telephone earpiece acts as a microphone being connected to the input of the amplifier and the head 14 is connected in the output circuit of transistor $TR_3$. The direct current in the collector circuit of the transistor $TR_3$ flows through the windings of head 14 thus producing the necessary D.-C. polarization or bias for recording.

This collector current can be varied over a useful range independently of the battery voltage by adjusting the value of the base bias resistor $R_6$ connecting the collector and base of transistor $TR_3$ and this resistor may either be a variable one or be selected to give the required D.-C. bias current for the particular head employed in the instrument.

The audio signal from earpiece 15 after amplification in $TR_1$, $TR_2$ and $TR_3$ is also impressed on the head and if this is traversed by hand in contact with and relative to a surface coated with magnetic compound, for example, a paper sheet or the like, recording of speech directed into the earpiece will take place. By simply moving the switch to its other position (shown in dotted lines) the earpiece is connected in the output circuit and the head in the input circuit of the amplifier so that the record can be read by traversing the head along the recorded track. The instrument may be made extremely compact. In a first example and as shown in FIGURE 2, all the components, with the exception of the telephone earpiece 15, may be mounted on the base plate 17 and subsidiary plate 18 of insulating material. The plate 18 carrying the amplifier components and switch 8 may be of printed circuit form for ease of manufacture and assembly. The head 14 is preferably mounted with a limited degree of freedom in the vertical direction and is spring pressed (downwards in the drawing) by a block of soft rubber or the like 19. The battery switch 20 (see also FIGURE 1) is operated by the head when the latter is pressed on the magnetic surface so that the amplifier is energized only when the actual reading or writing are in progress.

The complete assembly may be inserted from below in a housing 21 preferably of synthetic material, which carries on its top surface a switch operating button 22 with which the arm 23 of switch 8 engages when the housing is in position. The button 22 in turn carries a permanent magnet 24 which, by inverting the instrument, may be used for magnetizing the record sheet or medium to saturation in the correct sense before recording thereon thus automatically erasing any information previously stored on the sheet or medium, and also giving the requisite premagnetization for use with D.C. bias. The switch arm 23 is preferably spring pressed into the "read" position so that writing can only take place so long as the button 22 is maintained by manual action in the "write" position, to minimize the possibility of accidental erasure of a recording when reading is required.

One side of the housing may be provided with an aperture for the insertion of the battery, this aperture being closed by a cover which is sprung into position and is suitably shaped on its outer surface to provide a finger grip. A matching strip may be provided on the other side of the housing and the assembly may be retained within the housing by screws, normally covered by the battery, passing through the base plate 17 and housing 21 and engaging tapped holes in the matching strip.

Referring now to FIGURES 4, 5 and 6 in which like parts have the same reference numerals a preferred alternative constructional form is shown. The record/reproduce amplifier components are mounted together with the changeover switch, power source and magnetic record/reproduce head on a panel 17 of insulating material (FIGURE 6).

The power source, namely battery B, which may be of the kind having the designation "U16," is carried between contacts 25, 26 at the top of the panel and the magnetic record/reproduce head 14 is secured to the free end of a lever 27 pivoted at 28 on the panel. The head is urged in one direction (downwards in the drawing) (FIGURE 6) by a spring 29 and its travel in the approximately vertical direction is limited by stops (not shown).

The free end of the spring 29 is arranged to be in contact with a resilient blade switch contact 30 which makes contact with the battery switch contact 26 when the head is moved upwards. This movement completes the battery circuit and energizes the apparatus, and such movement normally takes place only when the apparatus contacts the medium.

The panel 17 with the components mounted upon it is contained within a housing 21, the vertical edges of the panel being disposed in grooves provided in the end walls of the housing. The base of the housing has an aperture 31 (FIGURE 4) through which the operative portion of the head (i.e. the pole pieces defining the gap in the head structure), may normally protrude.

The panel is retained in the housing by a cover or lid

32 (FIGURE 5) provided with spring clips 33, 34 for engagement with the housing to removably secure it in position.

The erase magnet 24 (FIGURES 4 and 5) may be mounted on one end wall of the housing 21 so that it may readily be brought into contact with the record medium and traversed over it by hand by holding the housing on end.

As in the preceding embodiment the apparatus remains de-energized when not actually in use for recording or reproducing (e.g. writing or reading) since the spring 29 is sufficiently strong to prevent the weight of the head closing the battery circuit through contacts 30 and 26 whatever the position of the housing, but is so set that when the base of the base of the housing is brought into contact with the recording medium the head is resiliently maintained in contact therewith with the necessary pressure and the battery circuit is closed.

The electro-acoustic transducer is preferably a miniature earphone of the deaf-aid type, that is to say, it may be of the electro-magnetic type and is electrically connected to the amplifier by a flexible cord. Such earphones have an aperture on one side of the diaphragm for the emission of sound to the ear. To enable the earphone to act as a microphone, particularly when it is used in conjunction with a stethoscope adapter as shown in FIGURE 4, an aperture or apertures 35 are provided in the casing of the earphone, that is to say, on the other side of the diaphragm.

The use of a stethoscope adapter, which can hang from the ears, is to be recommended since it positions the transducer always at the same place with relation to the mouth when the apparatus is in use which is advantageous during the recording process when the transducer acts as a microphone and it also removes the necessity for holding the microphone in the hand.

Other constructional forms may of course be envisaged within the scope of the invention, for example, only the head and changeover switch may be mounted in the housing adapted to be held in the hand, the other parts being mounted, for example, on or in the stethoscope adapter or in another container of suitable form. Naturally, changes may be made in the amplifier and other components of the instrument to suit particular circumstances as they arise in practice.

What is claimed is:

1. Magnetic recording and reproducing apparatus comprising a single magnetic head for recording and reproducing signals, an electro-acoustic transducer, an amplifier comprising a transistor having an input circuit and an output circuit, switching means connected to the head, said switching means being operative to selectively switch the connection of the head and the transducer to the input circuit and the output circuit of the amplifier, means for supplying premagnetization for a magnetic record medium during recording, said means comprising the D.C. current flowing in the output circuit of said transistor amplifier when said head is connected in the output circuit of the transistor, said head, transducer, amplifier and switching means being contained in a unitary housing capable of being held in the hand of a user for movement over a magnetic record medium, and a resilient member rigidly attached at one end to said housing and engaging at the other end thereof said magnetic head, said head being movable relative to said housing under the control of said resilient means.

2. Magnetic recording and reproducing apparatus comprising a single magnetic head for recording and reproducing signals, an electro-acoustic transducer, an amplifier comprising a transistor having a collector, a base and an emitter, the emitter circuit of the transistor constituting an input circuit and the collector circuit of the transistor constituting an output circuit, said switching means being operative to selectively switch the connection of the head and the transducer to the input circuit and the output circuit of the amplifier, means for supplying premagnetization for a magnetic record medium during recording, said means comprising the D.C. current flowing in the output circuit of said transistor amplifier when said head is connected in the output circuit of the transistor, said head, transducer, amplifier and switching means being contained in a unitary housing capable of being held in the hand of a user for movement over a magnetic record medium, and a resilient member rigidly attached at one end to said housing and engaging at the other end thereof said magnetic head, said head being movable relative to said housing under the control of said resilient means.

3. Magnetic recording and reproducing apparatus comprising a single magnetic head for recording and reproducing signals, an electro-acoustic transducer, an amplifier comprising a transistor having an input circuit and an output circuit, switching means connected to the head, said switching means being operative to selectively switch the connection of the head and the transducer to the input circuit and the output circuit of the amplifier, means for supplying premagnetization for a magnetic record medium during recording, said means comprising the D.C. current flowing in the output circuit of said transistor amplifier when said head is connected in the output circuit of the transistor, said head, transducer, amplifier and switching means being contained in a unitary housing capable of being held in the hand of a user for movement over a magnetic record medium, and an energizing switch in said housing for delivering power to the amplifier, said switch being actuated to energize the amplifier by movement of the magnetic head in one direction and to de-energize the amplifier by movement of the head in the opposite direction.

References Cited in the file of this patent

UNITED STATES PATENTS

| | | |
|---|---|---|
| 2,548,011 | Frost | Apr. 10, 1951 |
| 2,810,791 | West et al. | Oct. 22, 1957 |
| 2,822,425 | Hicks | Feb. 4, 1958 |
| 2,838,675 | Wanlass | June 10, 1958 |
| 2,866,009 | Genning et al. | Dec. 23, 1958 |
| 2,938,963 | Wildhauer | May 31, 1960 |